United States Patent [19]
Guckert et al.

[11] Patent Number: 5,213,182
[45] Date of Patent: May 25, 1993

[54] ELEVATOR DOOR OPERATOR COG BELT LINKAGE

[75] Inventors: Philippe Guckert, Saint Martin sur Ocre; Bruno P. Mehlman, Gien, both of France

[73] Assignee: Otis Elevator Company, Farmington, Conn.

[21] Appl. No.: 794,750

[22] Filed: Nov. 19, 1991

[51] Int. Cl.[5] .............................................. B66B 13/06
[52] U.S. Cl. ........................................ 187/56; 187/51; 187/52 R
[58] Field of Search ...................... 187/51, 52 R, 56; 198/844.2; 24/38, 31 B

[56] References Cited

U.S. PATENT DOCUMENTS

| | | | |
|---|---|---|---|
| 1,934,867 | 11/1933 | Lindstrom et al. | 187/52 R |
| 3,300,826 | 1/1967 | Read | 24/38 |
| 4,558,492 | 12/1985 | Hite et al. | 24/31 B X |
| 4,861,322 | 8/1989 | Reddick | 24/31 B X |

FOREIGN PATENT DOCUMENTS 2-81888 3/1990 Japan .
2-169487 6/1990 Japan .

Primary Examiner—Joseph E. Valenza
Assistant Examiner—Dean A. Reichard
Attorney, Agent, or Firm—Lloyd D. Doigan

[57] ABSTRACT

A system for opening and closing an elevator door panel utilizes a linkage which attaches a belt to the panel. The system is further characterized by a first portion of the belt having a first end and a second end, a housing for holding the first end in close proximity to the second end, and a second portion of the belt which is aligned in register with the first and second ends of the first portion. The second portion is clamped against the first and second ends of the first portion and against the housing so that the first portion of the belt forms a continuous shape.

8 Claims, 1 Drawing Sheet

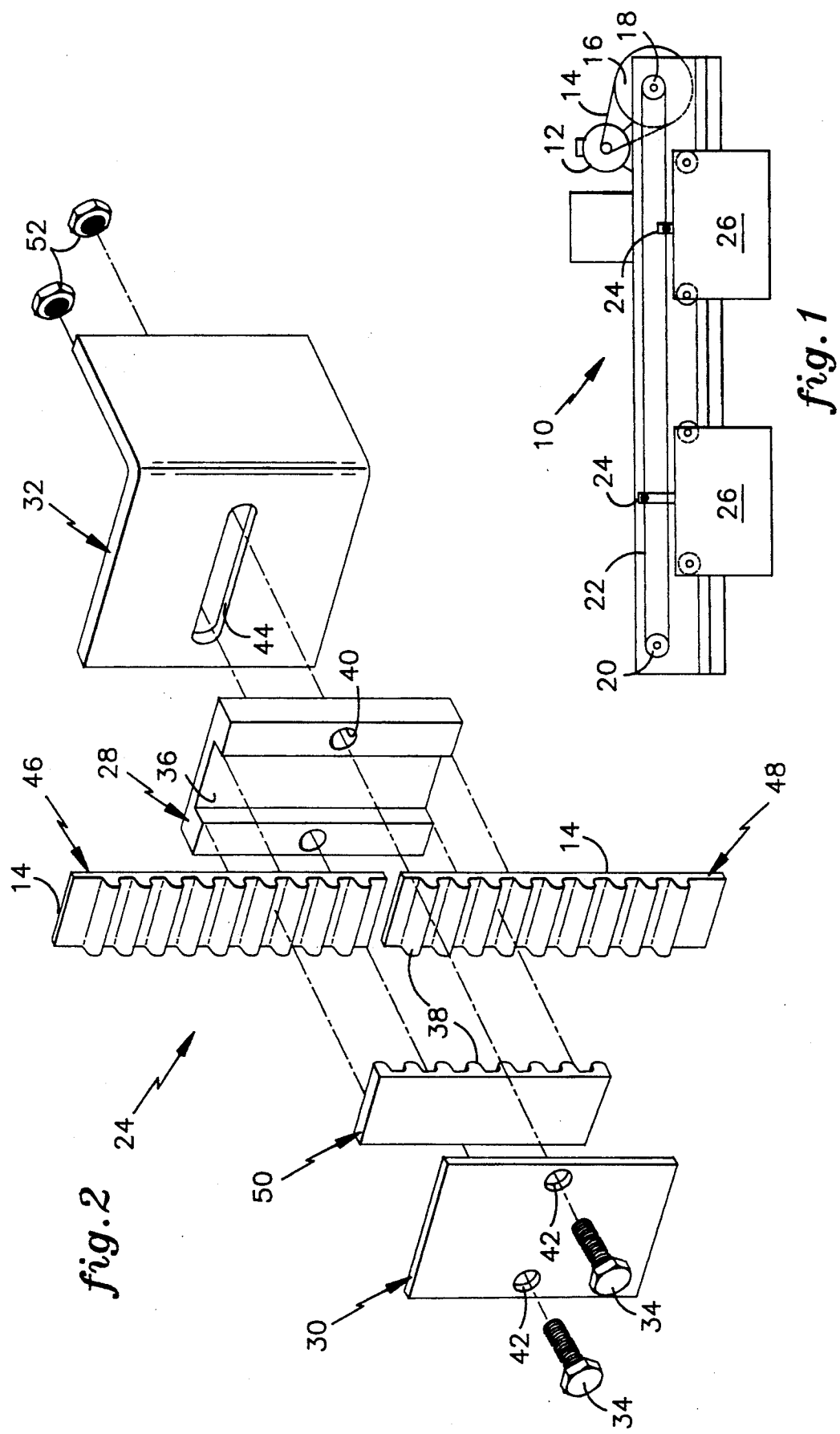

ELEVATOR DOOR OPERATOR COG BELT LINKAGE

TECHNICAL FIELD

This invention relates to an elevator door operator and more particularly to a linkage for connecting a door operator cog belt to itself and to a door panel.

BACKGROUND OF THE INVENTION

Some elevator door operating systems consist of a reversible motor, a belt, a speed reducing pulley, a transmission pulley, an idler pulley, and a continuous toothed belt. The motor transmits torque via the belt to the speed reducing pulley. The speed reducing pulley is attached to the transmission pulley. The cog belt, which extends around the transmission and idler pulleys, is driven by the transmission pulley. A portion of the cog belt travels linearly between the transmission pulley and the idler pulley. The linear motion of the cog belt is transmitted to each car door panel by means of a linkage.

DISCLOSURE OF THE INVENTION

It is an object of the invention to provide a cog belt and linkage which is inexpensive and easy to install.

It is a further object of the invention to tension a cog belt independently of the position of the door panels.

According to the invention, an elevator door operator drive belt is joined in a continuous shape by a linkage which attaches to a door panel. The linkage utilizes a separate portion of the belt to form a friction fit with each end of the belt. The linkage attaches to the door panel independently of the friction fit.

These and other objects, features, and advantages of the present invention will become more apparent in light of the following detailed description of a best mode embodiment thereof, as illustrated in the accompanying drawing.

BRIEF DESCRIPTION OF THE DRAWINGS

FIG. 1 is a perspective view of a door operating system employing an embodiment of a linkage of the invention; and, FIG. 2 is a perspective view, broken away of the linkage of FIG. 1.

BEST MODE FOR CARRYING OUT THE INVENTION

As shown in FIG. 1, a door operating system 10 comprises a reversible motor 12, a belt 22, a speed reducing pulley 16, a transmission pulley 18, an idler pulley 20, and a continuous toothed cog belt 14. A pair of linkages 24 transmit the motion of the belt to a pair of door operating panels 26.

Referring to FIG. 2, an expanded view of one of the linkages 24 of FIG. 1 is shown. The linkage comprises a housing 28, a clamping plate 30, a bracket 32 and a pair of threaded bolts 34. The housing has a groove 36 therein having a width that provides a slight interference fit with the width of the belt 14, and a depth that is approximately equal to the cross-sectional thickness of the teeth 38 of the belt. The housing has a pair of threaded openings 40 for mating with the threaded bolts 34. The plate has a pair of holes 42 which align with the threaded openings in the housing. The bracket 32 is L-shaped and has an elongated slot 44 for receiving the bolts.

In order to form a closed loop and transmit linear motion to the door panels, cog belt ends 46 and 48 are slid into close proximity in the groove 36. The interference fit in the groove helps maintain the ends of the belt in the housing until the clamping plate 30 is attached thereto. Once the two ends of the belt have been brought together and approximately centered in the groove 36, another piece 50 of the cog belt 14 is cut to approximately the length of housing 28 and is placed in register with both ends of the cog belt 46, 48 such that the teeth 38 of piece 50 mate with the teeth 38 in the cog belt ends 46, 48 thus forming a perfect link between cog belt ends.

The clamping plate 30 is then pressed against piece 50. The bolts 34 are then inserted through the holes 42 and threaded into the threaded openings 40 in the housing and tightened. By tightening the clamping plate to the housing, a solid link is achieved due to friction forces between the plate, the housing and the respective cog belt teeth. The bolts may then be inserted through the slot 44 in the bracket and tightened by means of nuts 52.

The threaded holes in the housing also allow the ends of the belt to be joined without having to link the device to the bracket 32, which is connected directly to an elevator door hanger (not shown). By means of the slot 44, the bracket may be finally positioned independently (depending on the length of the slot) of the housing position. As a result, the cog belt may be adjusted and tensioned without effecting the position of the door panels.

For a two speed car door configuration, only one linkage is connected to a door panel since the other door panel is driven by an air cord system (not shown). In a center opening configuration, two identical linkages are used (see FIG. 1). The first linkage connects two ends of the belt to form a continuous shape, as described above. The second linkage, which attaches to the other door panel, is positioned on the upper or lower portion of the belt, depending on the position of the first linkage. The second linkage is assembled in the same manner as the first linkage except that no ends are joined making assembly even easier.

Although, the invention has been shown and described with respect to a best mode embodiment thereof, it should be understood by those of ordinary skill in the art, that various omission, changes and additions in the form and detail thereof may be made without departing from the spirit and scope of the invention.

We claim:

1. A system for opening and closing an elevator door panel, the system comprising a linkage which attaches a belt to said panel, said system characterized by:
   a first portion of said belt, said first portion having a first end and a second end,
   a housing for holding said first end in close proximity to said second end,
   a second portion of said belt aligned in register with said first end and with said second end, and
   means for clamping said second portion against said first end and said second end of said first portion against said housing such that said first portion forms a continuous shape.

2. The system of claim 1 wherein said means for clamping is characterized by:
   a plate having an opening, a threaded opening in said housing, and
a threaded bolt which extends through said opening and mates with said threaded opening.

3. The system of claim 2 wherein said means for clamping is further characterized by:
a bracket for attaching to said panel, said bracket having adjustable means for receiving said bolt which extends through said housing to attach said bracket to said housing.

4. A system for opening and closing an elevator door panel, the system comprising a linkage which attaches a belt to said panel, said system characterized by;
a first portion of said belt, said first portion having a first end and a second end,
a second portion of said belt in register with said first end and with said second end, and
means for clamping said second portion against said first end and said second end of said first portion such that said first portion forms a continuous shape.

5. A system for opening and closing an elevator door panel, the system comprising a door panel, a belt, a drive for moving said belt, and a linkage attaching said belt to said panel, said system characterized by:
a first portion of said belt, said first portion having a first end and a second end, said first portion having a side having a cross-sectional shape for engaging said drive,
a housing for holding said first end in close proximity to said second end,
a second portion of said belt in register with said first end and with said second end, said second portion having a side having said cross-sectional shape for engaging said cross sectional shape of said first portion, and
means for clamping said side of said second portion against said side of said first end and said side of said second end of said first portion in said housing such that said first portion forms a continuous shape.

6. A linkage for use for joining a first end and a second end of an elevator drive belt, said linkage comprising;
a housing for receiving said first and second ends,
a separate portion of said belt in register with said first end and with said second end, and
means for clamping said separate portion against said first end and said second end such that said drive belt forms a continuous shape.

7. The linkage of claim 6 wherein said means for clamping is characterized by:
a plate having an opening,
a threaded opening in said housing, and
a threaded bolt which extends through said opening and mates with said threaded opening.

8. The linkage of claim 7 wherein said means for clamping is further characterized by:
a bracket, said bracket having adjustable means for receiving said bolt which extends through said housing to attach said bracket to said housing.

* * * * *